March 6, 1962  C. G. McDANIEL  3,023,655
CUTTING AND CLEANING TOOL
Filed Jan. 6, 1961  2 Sheets-Sheet 1
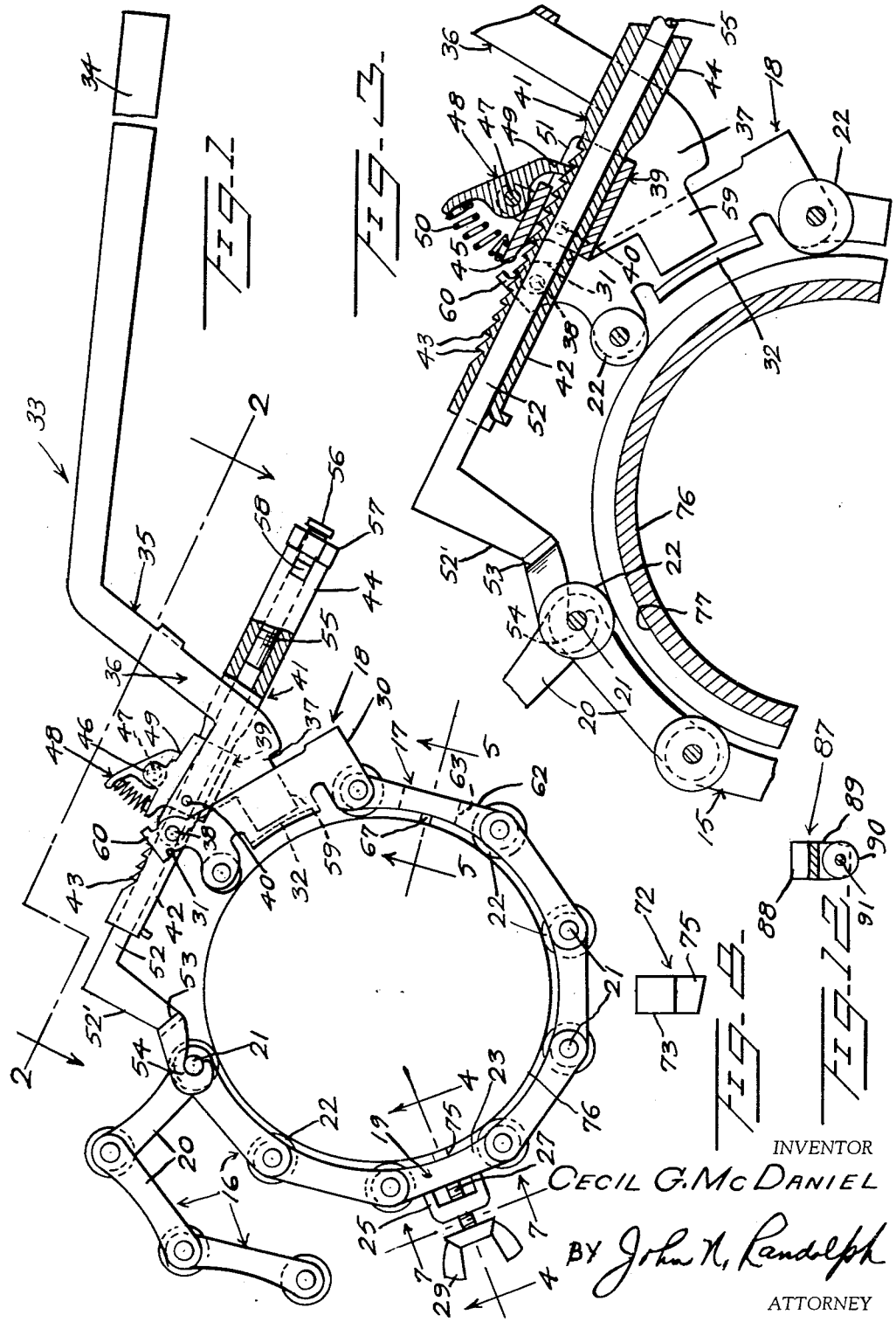
INVENTOR
CECIL G. McDANIEL
BY John N. Randolph
ATTORNEY March 6, 1962  C. G. McDANIEL  3,023,655
CUTTING AND CLEANING TOOL
Filed Jan. 6, 1961  2 Sheets-Sheet 2
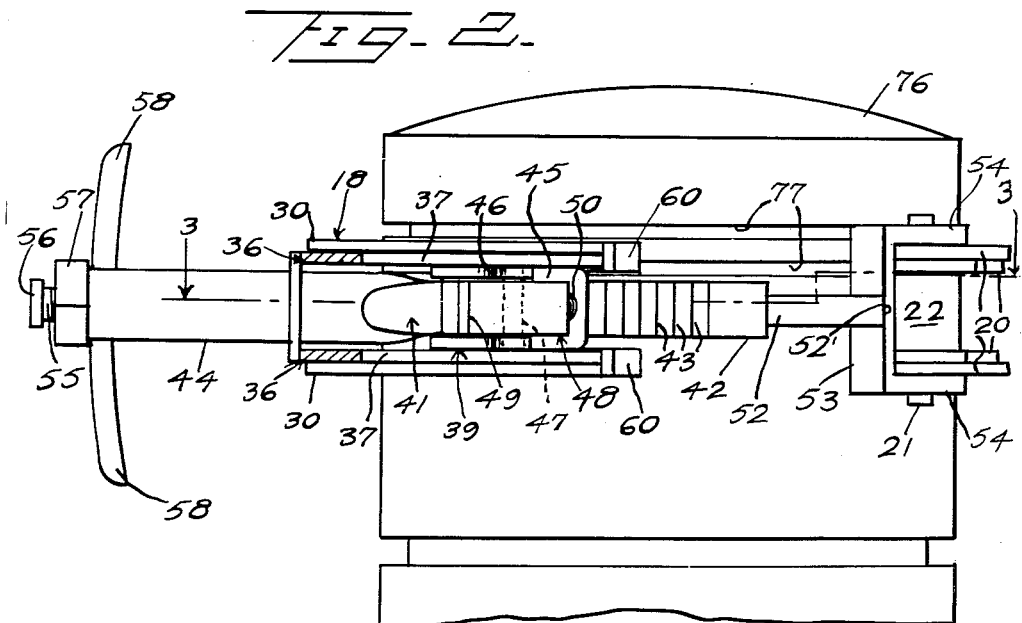
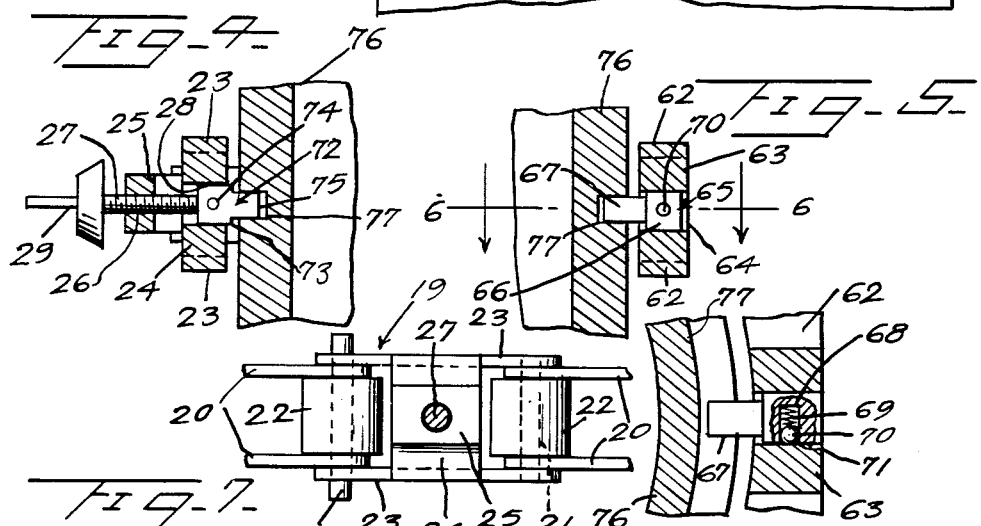
INVENTOR
CECIL G. McDANIEL
BY John N. Randolph
ATTORNEY United States Patent Office 3,023,655
Patented Mar. 6, 1962

3,023,655
CUTTING AND CLEANING TOOL
Cecil G. McDaniel, Box 174, Philipp, Miss.
Filed Jan. 6, 1961, Ser. No. 80,997
9 Claims. (Cl. 82—4)

This invention relates to a tool of novel construction for cutting stock of circular cross section, for cutting annular grooves in such stock, for cleaning previously cut grooves, and for enlarging previously cut grooves.

More particularly, it is an object of the present invention to provide a tool capable of being applied to stocks of various diameters including novel means for adjusting the effective diameter of the tool to adapt the tool to stock of any diameter within a substantial range.

Still another object of the invention is to provide a tool having interchangeable bits for accommodating the tool to different operations and different materials.

Still a further object of the invention is to provide a tool which encircles the stock to be operated upon and which is so constructed that the peripheral portion of the stock, around which the tool is disposed, will not be marred by operation of the tool thereon.

Various other objects and advantages of the invention will hereinafter become more fully apparent from the following description of the drawings, illustrating a presently preferred embodiment thereof, and wherein:

FIGURE 1 is a fragmentary plan view, partly in section, showing the tool in an applied position;

FIGURE 2 is an enlarged fragmentary sectional view, taken substantially along the line 2—2 of FIGURE 1;

FIGURE 3 is a fragmentary sectional view taken substantially along the line 3—3 of FIGURE 2;

FIGURE 4 is an enlarged fragmentary transverse sectional view, taken substantially along a plane as indicated by the line 4—4 of FIGURE 1;

FIGURE 5 is a similar view, taken substantially along a plane as indicated by the line 5—5 of FIGURE 1;

FIGURE 6 is an enlarged fragmentary sectional view taken substantially along a plane as indicated by the line 6—6 of FIGURE 5;

FIGURE 7 is an enlarged fragmentary sectional view, taken substantially along a plane as indicated by the line 7—7 of FIGURE 1;

FIGURE 8 is a side elevational view of one of the interchangeable bits of the tool;

FIGURES 9, 10 and 11 are end elevational views of other bits for use in the tool, and FIGURE 12 is a side elevational view, partly in vertical section, showing another tool bit.

Referring more specifically to the drawings, the cutting and cleaning tool in its entirety is designated generally 14 and includes a chain 15 composed of a plurality of connecting links 16, a guide link 17, a carrier link 18 and at least one tool carrying link 19.

Each connecting link 16 includes a pair of link members or bars 20. The link members or bars 20 of the adjacent links are connected together by pins or axles 21 which extend through the overlapping ends thereof and rollers 22 are journaled on said link members 20 between the overlapping ends of adjacent pairs of the link members.

The link 19 is located approximately midway of the ends of the chain 15 and between two of the links 16 and includes link members 23 which are connected to the link members 20 of the adjacent links 16 by axles 21, but which differ from said link members 20, in that the link members 23 are connected by an integral block 24, as seen in FIGURES 4 and 7, and which is disposed between and spaced from the two rollers 22 which are mounted on the axles 21 which connect the link 19 to the links 16, between which the link 19 is disposed. The block 24 is provided on its outer side with an arch 25 the outer portion of which has a threaded bore 26 to receive a feed screw 27 which is threaded inwardly therethrough and which aligns with and extends into an opening 28 of the block 24. The opening 28 extends through the block 24 and is of noncircular cross section. The screw 27 has a wing-type head 29 at its outer end to enable said screw to be manually advanced or retracted.

The link 18 constitutes an end link of the chain 15 and is larger than the links 16, 17 and 19 and includes substantially enlarged side plates 30 having axles 21 extending through the ends thereof for journaling rollers 22. One of the axles 21 connects the end link or carrier 18 to an end of the link 17, which is located adjacent thereto. The side plates 30 have extensions 31 which are disposed outwardly of the other axle 21 of said link 18. The side plates 30 have inwardly extending bottom flanges 32, as best seen in FIGURE 3, which are disposed between the rollers 22 of said link.

A handle 33 includes an elongated substantially straight grip portion 34 and a bifurcated shank 35 which extends at an oblique angle from an inner end of the grip portion 34 and which includes corresponding laterally spaced furcations 36 having outwardly turned terminal portions or arms 37. Distal ends of the arms 37 fit between the extensions 21 and are connected thereto by trunnions 38 which are journaled in said extensions 31 for swingably mounting the handle 33 on the carrier or link 18.

A collar 39 is disposed between the arms 37 and is pivotally connected thereto by aligned pins or trunnions 40, which are located adjacent an end of the collar which is disposed near to but spaced from the trunnions 38, for pivotal or swinging movement of said collar relative to the handle 33. A sleeve 41 has an end portion 42 of noncircular cross section which fits slidably in the collar 39. An outer side of said sleeve end 42 is provided with ratchet teeth 43 which are inclined away from the other rear end 44 of the sleeve. The collar 39 has an outer wall 45 provided with laterally spaced ears 46 which project outwardly therefrom. A pivot pin 47 engages turnably in the ears 46 and through an intermediate portion of a pawl 48 having a nose 49 at one end thereof. A compression spring 50 is disposed between the other end of the pawl 48 and a forward end of the collar wall 45 for urging the pawl 48 to rock on its pivot 47 in a direction for swinging the nose 49 inwardly through a recessed rear end 51 of the collar wall 45 and into engagement with the ratchet teeth 43, to normally prevent the sleeve 41 from sliding forwardly or from right to left through the collar 39, or to permit said sleeve to be slidably moved in the opposite direction or rearwardly.

A rod 52 extends slidably and nonturnably through the sleeve 41 and has an angularly projecting extension 52' at its forward end, which is disposed forwardly of the sleeve 41, and which terminates in an outwardly projecting fork 53 having laterally spaced forwardly extending hook shaped tines or furcations 54, the hooks of which open rearwardly and below said tines, as seen in FIGURES 1 and 3. The other rear end of the rod 52 is of circular cross section and threaded, as seen at 55, and extends through and outwardly from the sleeve end 44 and terminates in a head 56. A nut 57 is threadedly mounted on the rod portion 55, between the sleeve end 44 and head 56. The sleeve end 44, adjacent its distal end, is provided with aligned outwardly projecting finger grips 58, as best seen in FIGURE 2.

The arms 37 are provided with depending extensions 59 which are disposed between and against the side plates 30 and which are movable into engagement with the inturned flanges 32. The extensions 31 are provided at their forward edges with stops 60 which straddle the sleeve portion 42 and which are disposed beyond and in close proximity to the distal ends of the arms 37, to be engaged by said arms to limit swinging movement of the handle 33 about its pivots 38 in a counterclockwise direction from the position of said handle as seen in FIGURES 1 and 3.

The link 17 constitutes a guide link and is similar to the link 19 in that it includes link elements 62 which are connected, intermediate of their ends, by an integral block 63, as seen in FIGURES 5 and 6, which block has an opening 64 extending therethrough and of noncircular cross section. The block 63 is disposed between and spaced from the rollers 22 which are journaled in the ends of said link 17.

A guide bit 65 includes a shank 66 which fits slidably and nonturnably in the opening 64, and a stem 67 which projects from an inner end of said shank and from the inner side of the block 63. The shank 66 is transversely recessed to provide a socket 68 to contain a spring 69 and a ball 70. The ball 70 is urged outwardly of the socket by the spring 69 to frictionally engage a wall of the opening 64 to releasably retain the shank 66 therein. The mouth of the socket 68 is peened or restricted, as seen at 71 in FIGURE 6, so that less than half of the ball 70 can be projected from the socket 68, as is conventional.

A cutting or cleaning bit 72 is shown in FIGURE 4 including a shank 73 which fits slidably and nonturnably in the opening 28 and which has a spring pressed ball 74, corresponding to the spring pressed ball 70, to releasably retain the shank therein. The bit 72 includes a blade 75 which projects from the inner end of the shank 73 and from the inner side of the block 24.

The tool 14 is shown applied to a piston 76. To apply the tool, the chain 15 is positioned around the piston and with the stem 67 and blade 75 engaging a groove 77 thereof. The pawl 48 is manually released so that the sleeve 41 can be advanced forwardly through the collar 39, from right to left of FIGURES 1 and 3. The nut 57 is backed off against the head 56 so that the rod 52 can be displaced forwardly through the sleeve 41. The axles 21 located between the chain end, disposed remote from the link 18, and the link 19 extend outwardly from the sides of said links 16, as seen in FIGURES 2 and 7. The hooks 54 are spaced apart so as to straddle said links and for engaging the ends of an axle 21, located as near as possible to the link 19. The hooks 54 are connected to one of the axles 21 after the handle 33 has been swung counterclockwise from its position of FIGURES 1 and 3 to thus further advance the collar 39, sleeve 41 and hooks 54. It will be apparent that by this arrangement and as illustrated in FIGURE 1, that the tool 14 is capable of fitting pistons and other round stock of different diameters and within a substantially wide range.

After the hooks 54 are in engagement with an axle 21, the nut 57 is advanced against the sleeve end 44, after which the finger grips 58 are manually engaged for pulling the sleeve 41 and rod 52 rearwardly or from left to right relative to the collar 39 and handle 33 with the ratchet teeth 43 riding under the pawl nose 49. The pawl will catch and hold the sleeve 41 retracted as far as possible manually in this manner. If it is necessary to take up some additional slack in the chain 15, between the hooks 54 and link 18, this can be accomplished by further advancing or tightening the nut 57 with a tool. The handle 33 is then swung clockwise about its pivots 38 to and slightly beyond its position of FIGURES 1 and 3 and until the extensions 59 bear on the flanges 32. During this movement of the handle 33 pivot 40 swings across an extension of a straight line passing through the axle 21, engaged by the hooks 54, and pivot 38, for retaining the handle thus positioned with the lugs 59 against the flanges 32. Thereafter, nut 57 can be advanced toward the sleeve end 44 to further tighten the chain 15. A further clockwise pulling force on the handle 33 will cause the tool to revolve clockwise around the piston or stock 76, as seen in FIGURES 1 and 3, so that the blade 75 will either clean or cut and clean the groove 77, depending upon the shape of said blade and the extent that it is advanced into the groove 77 by advancement of the screw 27. The guide stem 67 has a sufficiently close fitting engagement between the side walls of the groove 77 to prevent the part of the chain located adjacent thereto from slipping either upwardly or downwardly relative to the piston for maintaining the tool 14 in a plane substantially parallel to the plane of the groove 77.

It will be noted that the rollers 22 are of a sufficient diameter to maintain all of the chain links including the link 18 out of contact with the piston or stock 76 so that only said rollers, the stem 67 and blade 75 contact the piston.

FIGURE 9 shows a bit 78 having a shank 79, corresponding to the shank 73, and a narrow cutting blade 80. The shank 79 can be applied to the opening 28 instead of the shank 73 and the bit 80 used with the tool 14 for cutting pipe and other tubular or cylindrical stock of various diameters.

FIGURE 10 shows a bit 81 corresponding to the bit 72, except that the blade 82 may be of a different size and has an auxiliary cutter 83 on one side thereof for enlarging a groove. FIGURE 11 illustrates a bit 84, corresponding to the bit 81, except that both sides of its blade 85 are provided with auxiliary cutter elements 86, each of which is adapted to function in the same manner and for the same purpose as the auxiliary cutter 83.

FIGURE 12 discloses a bit 87 for cutting glass and other cylindrical or tubular stock of circular cross section and which includes a shank 88, corresponding to the shank 73. In lieu of a blade, the bit 87 has a fork 89 projecting from one end of the shank 88 in which a cutting wheel 90 is journaled on an axle 91.

It will also be readily apparent that a cutting or cleaning bit could be substituted in the guide link 17 for the guide bit 65.

Various other modifications and changes are contemplated and may be resorted to, without departing from the function or scope of the invention as hereinafter defined by the appended claims.

I claim as my invention:

1. A tool of the character described comprising a roller chain including an end link forming a carrier, a handle swingably mounted on said carrier for swinging movement lengthwise of the chain, a hook means selectively engageable with links of the chain located remote from said carrier, means pivotally and slidably connecting said hook means to the handle, means, forming a part of said hook means, for adjustably latching the hook means in different slidably adjusted positions to the handle for holding the chain link engaged by the hook means relative to said carrier to position the chain snugly about a piece of circular stock, said chain including a bit carrying link spaced from said carrier, a bit having a shank detachably mounted in said bit carrying link and a blade extending inwardly therefrom adapted to engage the stock, and said handle being swingable inwardly of the chain toward the carrier and away from the link engaged by said hook means for drawing said link toward the carrier and for revolving the tool around the stock to cause said blade to execute a circular cut in the stock or to clean a groove of the stock engaged by the blade.

2. A tool as in claim 1, said rollers being of a diameter to support the chain links and carrier out of contact with the stock.

3. A tool as in claim 1, said chain including a guide link located adjacent said carrier and spaced from said bit carrying link, a guide bit including a shank detachably mounted in said guide link and a guide stem projecting from said shank and inwardly from the carrier link for engaging a groove engaged by said blade to combine with said blade for supporting the tool in a plane parallel to the plane of the groove.

4. A tool as in claim 1, and a manually operable feed screw mounted on said bit carrying link and engaging an outer end of the bit shank for advancing the bit inwardly of the bit carrying link and for retaining the bit against outward displacement relative to said link.

5. A tool as in claim 1, axles forming a part of said chain and connecting the links thereof and journaling the chain rollers, said hook means including hook shaped furcations straddling a link of the chain and engaging the ends of one of said axles.

6. A tool as in claim 1, said handle being pivotally connected at one end thereof to an end of said carrier located remote from the next adjacent link of the chain, said hook means including a collar pivotally connected to the handle adjacent to but spaced from the handle pivot, a sleeve slidably mounted in said collar, a rod connected to and extending through said sleeve and having hook elements at one end thereof for engaging said chain link, a pivotally mounted spring pressed pawl carried by said collar, and said sleeve having a rack portion engaged by said pawl for latching the sleeve to the collar, said rack portion and pawl constituting said latch means.

7. A tool as in claim 6, and means for adjustably advancing the rod through said sleeve for displacing the hook elements toward the sleeve and carrier.

8. A tool as in claim 1, said handle having a part swingably movable into engagement with a part of the carrier as the handle is swung toward the carrier and for supporting the handle while the tool is revolved by the handle around the stock.

9. A tool of the character described comprising a roller chain including an end link forming a carrier, a handle swingably mounted on said carrier for swinging movement lengthwise of the chain, hook means selectively engageable with links of the chain located remote from said carrier, means pivotally and slidably connecting said hook means to the handle, said hook means including a latch adjustably latching the hook means in different slidably adjusted positions to the handle for holding the chain link engaged by said hook means in different adjusted positions relative to the carrier to position a part of the chain around a piece of circular stock, said chain including a bit carrying link spaced from said carrier, a bit supported by said bit carrying link and projecting inwardly therefrom to engage the stock, and said handle being swingable inwardly of the chain toward the carrier and away from the link engaged by said hook means for drawing said link toward the carrier and for revolving the tool around the stock to cause the bit to execute a circular cut in the stock or to clean a groove of the stock engaged thereby.

References Cited in the file of this patent

UNITED STATES PATENTS 2,381,156   Gill et al. _____ Aug. 7, 1945
2,716,280   Ruhe _____ Aug. 30, 1955